United States Patent [19]
Coenen

[11] Patent Number: 6,006,510
[45] Date of Patent: Dec. 28, 1999

[54] OPEN-END SPINNING DEVICE

[75] Inventor: Norbert Coenen, Mönchengladbach, Germany

[73] Assignee: W. Schlafhorst AG & Co., Moenchengladbach, Germany

[21] Appl. No.: 09/299,891

[22] Filed: Apr. 27, 1999

[30]      Foreign Application Priority Data

May 4, 1998  [DE]  Germany ........................... 198 19 766
Aug. 10, 1998 [DE]  Germany ........................... 198 35 932

[51] Int. Cl.$^6$ ..................................................... D01H 4/00
[52] U.S. Cl. ............................................. 57/406; 57/404
[58] Field of Search .............................. 310/90.5; 57/404, 57/406; 384/610

[56]          References Cited

U.S. PATENT DOCUMENTS

| 3,747,998 | 7/1973 | Klein et al. ................................ 308/10 |
| 5,111,651 | 5/1992 | Pohn et al. ................................ 57/413 |
| 5,622,040 | 4/1997 | Preutenborbeck et al. ............... 57/406 |

FOREIGN PATENT DOCUMENTS

| 492079 | 2/1930 | Germany . |
| 26 07 266 A1 | 1/1977 | Germany . |
| 41 00 587 A1 | 7/1992 | Germany . |
| 42 16 408 A1 | 12/1993 | Germany . |
| 195 42 079 A1 | 6/1996 | Germany . |
| 195 43 745 A1 | 5/1997 | Germany . |
| 61-294217 | 12/1986 | Japan . |

OTHER PUBLICATIONS

Elektrisher Stromdurchgang durch Walzlager SKF TSP 4035.

Verhalten der Fasern im elektrostatischen Feld Textiltedinik 28 (1978) 12.

*Primary Examiner*—William Stryjewski
*Attorney, Agent, or Firm*—Kennedy, Covington, Lobdell & Hickman, LLP

[57]            ABSTRACT

An open-end spinning device 1 with a bearing arrangement for supporting a spinning rotor 3, which is seated so it can rotate at high turning frequency and is electrically insulated in relation to the housing of the spinning device and of the bearing. The static charge being created on the spinning rotor 3 during the spinning process is diverted to a grounded component of the spinning device 1 by means of an electrical conducting mechanism. The electrical conducting mechanism 40 is arranged in the area of the axial bearing 18.

10 Claims, 7 Drawing Sheets

OPEN-END SPINNING DEVICE

FIELD OF THE INVENTION

The present invention relates to an open-end spinning device with a bearing arrangement for supporting a spinning rotor, which is seated so it can rotate at high turning frequency, and wherein its seating provides electric insulation from the bearing and the housing.

BACKGROUND OF THE INVENTION

Open-end spinning devices with such rotor bearing arrangements are known in various different embodiments, and have been extensively described, for example in German Patent Publications DE 195 43 745 A1, DE 196 01 034 A1, DE 197 05 607 A1 or DE 41 17 175 A1.

For example, German Patent Publication DE 195 43 745 A1 describes an embodiment in which the spinning rotor is supported both radially and axially by means of a magnetic bearing arrangement. The magnetic bearing at the end of the rotor shaft described in German Patent Publication DE 195 43 745 A1 has a magnetic rotor ring as well as a magnetic stator ring. Here, the two magnetic rings are aligned magnetically in such a way that a bearing gap is created between them. To suppress the radial oscillations of the magnetically seated spinning rotor, which occur in particular during a starting phase, the stator magnet is furthermore seated with its movements limited in the radial direction. Here, the radial deflections of the magnetic stator ring are damped by a mechanical friction device.

However, it is disadvantageous with this known installation that the static charge, which in particular occurs during the spinning of synthetic materials in the area of the spinning rotor, cannot be dissipated in a defined manner, since the spinning rotor is electrically insulated from the grounded components of the open-end spinning device. This electric charge has an interfering effect on the spinning process.

In the open-end spinning device in accordance with German Patent Publication DE 197 05 607 A1, the spinning rotor is supported with its rotor shaft in the wedge gaps of a support ring bearing, and rests axially against an aerostatic bearing. The rotor shaft is made of carbide, at least in the area of the bearing surface which cooperates with the axial bearing.

Because of the electrically insulated bearing of the spinning rotor, it is also possible with this known bearing arrangement for a static charge of the spinning rotor to appear during spinning of synthetic material in particular, leading to disadvantageous effects on the spinning process. Even temporary unintentional contact between the rotor shaft bearing surface and the bearing plate of the axial bearing, made of a carbon material, cannot produce a sufficient removal of the charge.

An open end spinning device is furthermore known from German Patent Publication DE 196 01 034 A1, in which the spinning rotor is aerostatically seated both radially and axially. As with the above described bearing arrangements, the bearing arrangement in accordance with German Patent Publication DE 196 01 034 A1 also has the problem that a permanent electric insulation of the spinning rotor during the spinning operation is produced because of the air gap of the aerostatic bearing, and therefore no sufficient removal of the electrostatic charge created during spinning takes place.

The problem of insufficient grounding of the spinning rotor, in particular in the course of processing synthetic feed materials, is also present in bearing arrangements of open-end spinning devices, such as those known from German Patent Publication DE 41 17 175 A1. With these bearing arrangements, which per se have proven themselves in actual use, the radial seating of the rotor shaft is customarily provided by plastic-coated support rings. Since the rotor shaft has a non-conducting, for example oxide-ceramic, insert in the area of its axial support, this also leads to an electric insulation and therefore to a static charge buildup of the spinning rotor.

SUMMARY OF THE INVENTION

In view of open-end spinning devices of the type described above, it is an object of the invention to improve such spinning devices. It is intended in particular to create a device which provides a dependable removal of the developing static charge from the spinning rotor, even when spinning synthetic material.

Basically, the present invention is adapted to open-end spinning devices of the type which essentially comprise a housing, a spinning rotor, and a bearing arrangement for supporting the spinning rotor for rotation within the housing at high turning frequency, and wherein the bearing arrangement is adapted for producing an electric insulation of the rotor from the bearing and the housing. In accordance with the invention, the foregoing object is attained by means of an arrangement for removing static charges created during operation of the spinning device which basically comprises an electrical conducting mechanism for connecting the spinning rotor with a grounded component of the spinning device.

The embodiment in accordance with the invention has the particular advantage that it is possible by means of a permanent electrically conducting connection of the spinning rotor with a grounded component, preferably the housing of the spinning device, to dependably prevent in a simple manner a static charge buildup on the spinning rotor, such as occurs in particular during spinning of synthetic fibers (for example polyester) or of mixed yarns with a relatively large proportion of synthetic fibers, because of the high draw-off speed of the yarn, as well as the high turning frequency of the spinning rotor.

In a preferred embodiment, the conducting mechanism is advantageously arranged stationarily in the area of an axial bearing of the spinning rotor and rests against the rotor shaft, for example with a movable component.

More specifically, the electrical conducting mechanism may advantageously comprise a diverter element which is acted upon by a force and can be placed against the rotor shaft, with the diverter element connected in an electrically conducting manner with the housing of the spinning device. A permanent connection of the spinning rotor to a grounded component is here assured because of the frictional connection of the diverter element.

In a preferred embodiment, it is provided that the frictional connection of the diverter element is provided by means of a spring, preferably a pressure spring. Such a pressure spring dependably provides the basis for a continuous good contact of the diverter element with the spinning rotor. This contact is also assured during oscillations of the rotor shaft, such as can occur, for example, during the run-up, i.e., starting, phase of a magnetically seated spinning rotor, in particular when passing through its natural oscillation frequency.

A pointed cone, for example, can be used as a preferred embodiment of a diverter element. Such a shape of a diverter element brings the advantage that the diversion point lies in the center of the front face of the rotor shaft, so that in spite of the high turning frequency of the spinning rotor hardly any relative speed occurs between the diverter element and is contact face on the center of the rotor shaft. In this way, wear of the components involved, i.e., the rotor shaft as well as of the diverter element, can be kept within acceptable limits.

In an alternative embodiment of a conducting mechanism, the diverter element is shaped in the form of a spherical element. The advantages achievable with such an embodiment are similar to those of the conical embodiment described above. In addition, because of the spherical surface, the contact surface of the diverter element with the rotor shaft always remains the same, even with vibrations or oscillations of the rotor shaft, so that a constant diversion of the static charge is always assured, even in the oscillation range.

In an advantageous embodiment, the rotor shaft has a centering bore at the contact point with the diverter element. Such a centering bore promotes a centering of the diverter element in the center of the front face of the rotor shaft, in particular with the above described embodiment of the diverter element as a pointed cone or a sphere, which has a positive effect because of the improved fixation of the position of the diverter element.

In a further aspect of the invention, the diversion of the static charge being built up on the spinning rotor is provided by means of a wiper, which can rest against the front face and also against the circumferential face of the rotor shaft. Since an asymmetric application of force can have a disadvantageous effect on the running of the spinning rotor when a single wiper is employed on the rotor shaft circumference, in particular in case of contactless seating, excessive radial force should not be applied to the rotor shaft. With a magnetic or aerodynamic seating of the spinning rotor, it is more advantageous to use several wipers in the interest of a force equalization, which wipers compensate for each other in respect to their introduction of force.

A particularly advantageous embodiment of an electrical conducting mechanism for use in connection with a magnetically seated spinning rotor utilizes a sliding bearing integrated with the device for the radial damping of the rotor shaft which sliding bearing extends around the rotor shaft or a dynamically balanced rotor pin with little play. In this case, the sliding bearing preferably is made of a weakly conducting material.

Further details, features and advantages of the invention will be explained and understood from the exemplary embodiments described below and represented by means of the accompanying drawings.

DETAILED DESCRIPTION OF THE PREFERRED EMBODIMENTS

Figure 1:
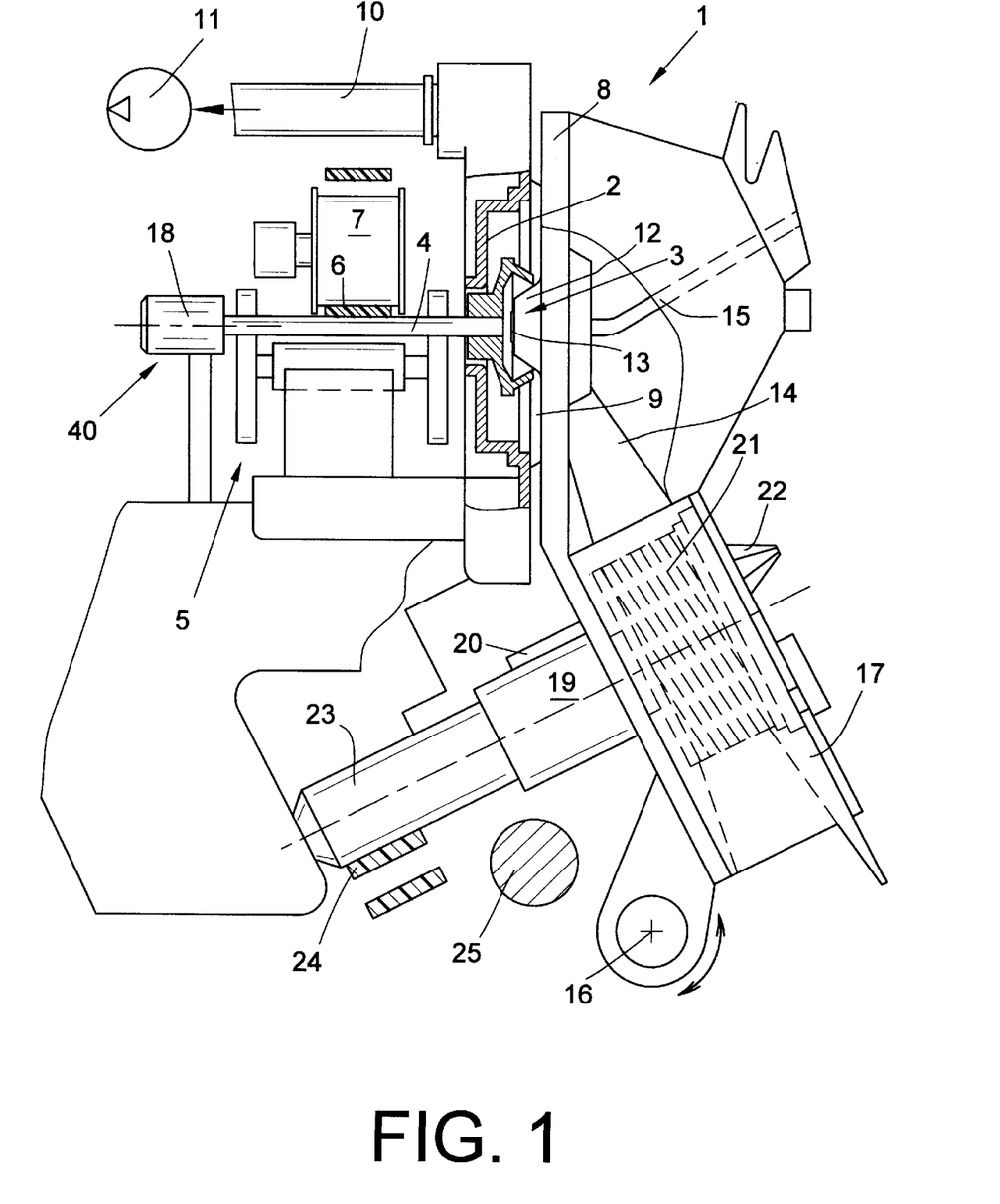
FIG. 1 is a schematic side elevational view of an open end spinning device in accordance with the present invention.

An open-end spinning device is represented in FIG. 1 and is identified as a whole by the reference numeral 1. In a known manner, the spinning unit has a rotor housing 2, in which the spinning cup of a spinning rotor 3 rotates at high rpm. The spinning rotor 3 is supported with its rotor shaft 4 in the bearing wedges of a support ring bearing 5 and is acted upon by a tangential belt 6 extending over the length of the machine and placed against the shaft 4 by a pressure roller 7. The axial fixation of the rotor shaft 4 on the support ring bearing 5 is provided by means of a permanent magnet axial bearing 18. Preferably, a diverter mechanism, not represented in FIG. 1, is arranged in the area of the permanent magnet axial bearing 18, which will be explained in detail below by means of the advantageous embodiments represented in FIGS. 2 to 7.

As is customary, the rotor housing 2, which is open toward the front, is closed during operation by a pivotably seated cover element 8, into which a conduit plate, not shown in detail, is set with a seal 9. Moreover, the rotor housing 2 is connected by means of an appropriate aspirating line 10 to an vacuum source 11, which generates the underpressure required for spinning in the rotor housing 2.

A conduit plate adapter 12 is arranged in the cover element 8, and includes a yarn draw-off nozzle 13 as well as the end area of the fiber guide conduit 14. A small yarn draw-off tube 15 adjoins the yarn draw-off nozzle 13. In addition, an opening roller housing 17 is fixed in place on the cover element 8, which is seated to be pivotable in a limited manner around a pivot shaft 16. Furthermore, the cover element 8 has seating brackets 19, 20 on its back for seating an opening roller 21 and a sliver draw-in cylinder 22. In the area of its wharve 23, the opening roller 21 is driven by a circulating tangential belt 24 extending over the length of the machine, while the drive (not represented), of the sliver draw-in cylinder 22 preferably is provided by a worm drive arrangement connected to a driveshaft 25 extending over the length of the machine.

Figure 2:
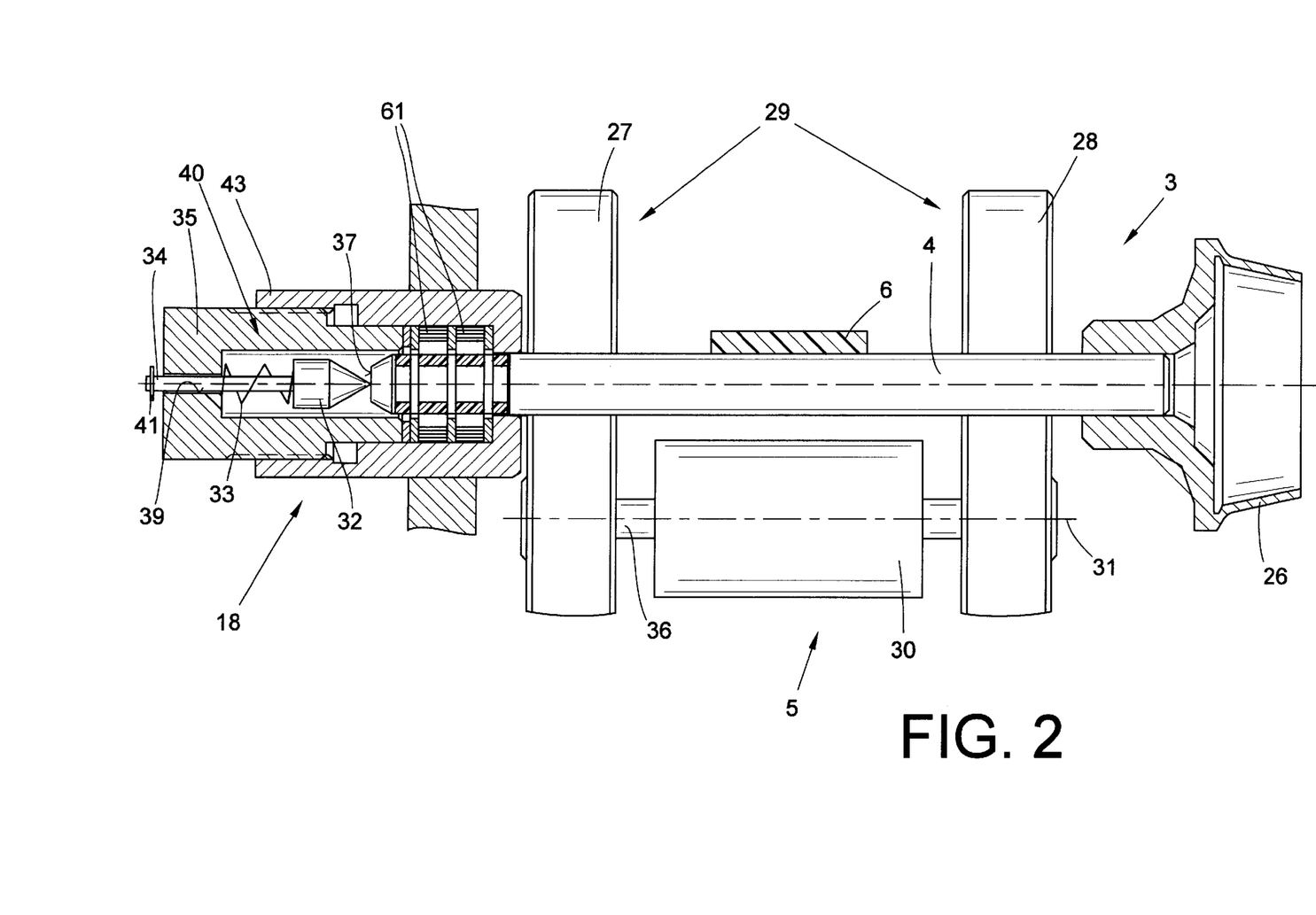
FIG. 2 is an enlarged side elevational view of a spinning rotor rotating in a support ring bearing with a magnetic axial bearing, with an embodiment of the conducting mechanism in accordance with the invention shown in cross-section and equipped with a diverter element in the shape of a pointed cone.

FIG. 2 shows the seating of the open-end spinning rotor 3 in detail, wherein an axial bearing 18 with an advantageous embodiment of a diverter element is represented in a sectional view. As indicated, the spinning rotor 3, which consists of a spinning cup 26 and a rotor shaft 4, is supported with its rotor shaft 4 in the bearing wedges of a support ring bearing, indicated as a whole by 5.

In a known manner, such support ring bearings 5 have two pairs of support rings, whose axes 31 extend parallel in respect to each other. For the sake of clarity, only one pair of support rings 29, located at the rear as viewed in FIG. 2, is represented with its support rings 27, 28. Here, the support rings 27, 28 are fixed in place on a common shaft 36 rotating in a rolling bearing arrangement 30. In addition, the support rings 27, 28 have a coating in the area of their running surfaces, which results in an electrically insulated seating of the spinning rotor 3.

The diverting mechanism, identified as a whole by 40, can be seen in the area of the axial bearing 18, in which axial bearing magnets 61 can also be seen. The diverting mechanism consists of a diverter element 32 embodied as a pointed cone, which is placed against the front end face 37 of the rotor shaft 4, and a force-exerting pressure spring 33 supported on a locking element 35, which also fixes the magnetic rings 61 of the axial bearing 18 in place. The axial bore 39 in the locking element 35 is used for the guidance of a guide pin 34, which in turn is connected with the conical diverter element 32. The locking element 35 is screwed into the stationary bearing component 43 of the axial bearing 18. The diverter mechanism 40 is secure against falling out, for example in case of a replacement of the rotor 3, by the securing ring 41 which is fixed in place in a groove on the guide pin 34.

Figure 3:
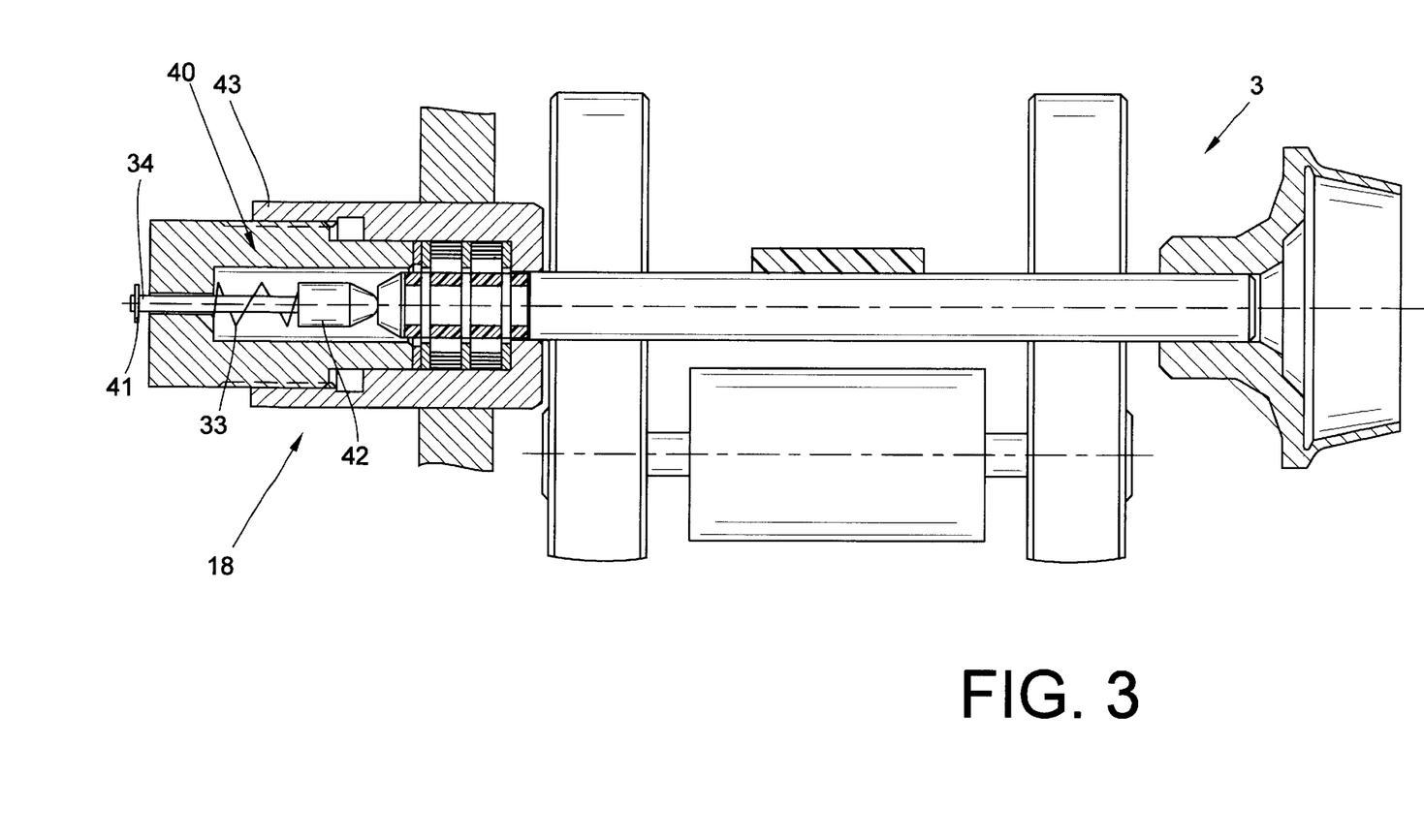
FIG. 3 is another side elevational view of a spinning rotor rotating in a support ring bearing with a magnetic axial bearing similar to FIG. 2, but equipped with a conducting mechanism whose diverter element has a convex contact face.

Another embodiment of a diverter mechanism 40 represented in FIG. 3 differs from the exemplary embodiment represented in FIG. 2 by the particular shape of the diverter element 42. In contrast to the diverter element 32 in the shape of a pointed cone, the diverter element, here identified by the reference numeral 42, has a convexly-arched contact surface. The force application as well as the fixation in place of the diverter element 42 in the housing of the axial bearing preferably is accomplished by a spring arrangement as already explained in connection with the exemplary embodiment in FIG. 2.

Figure 4:
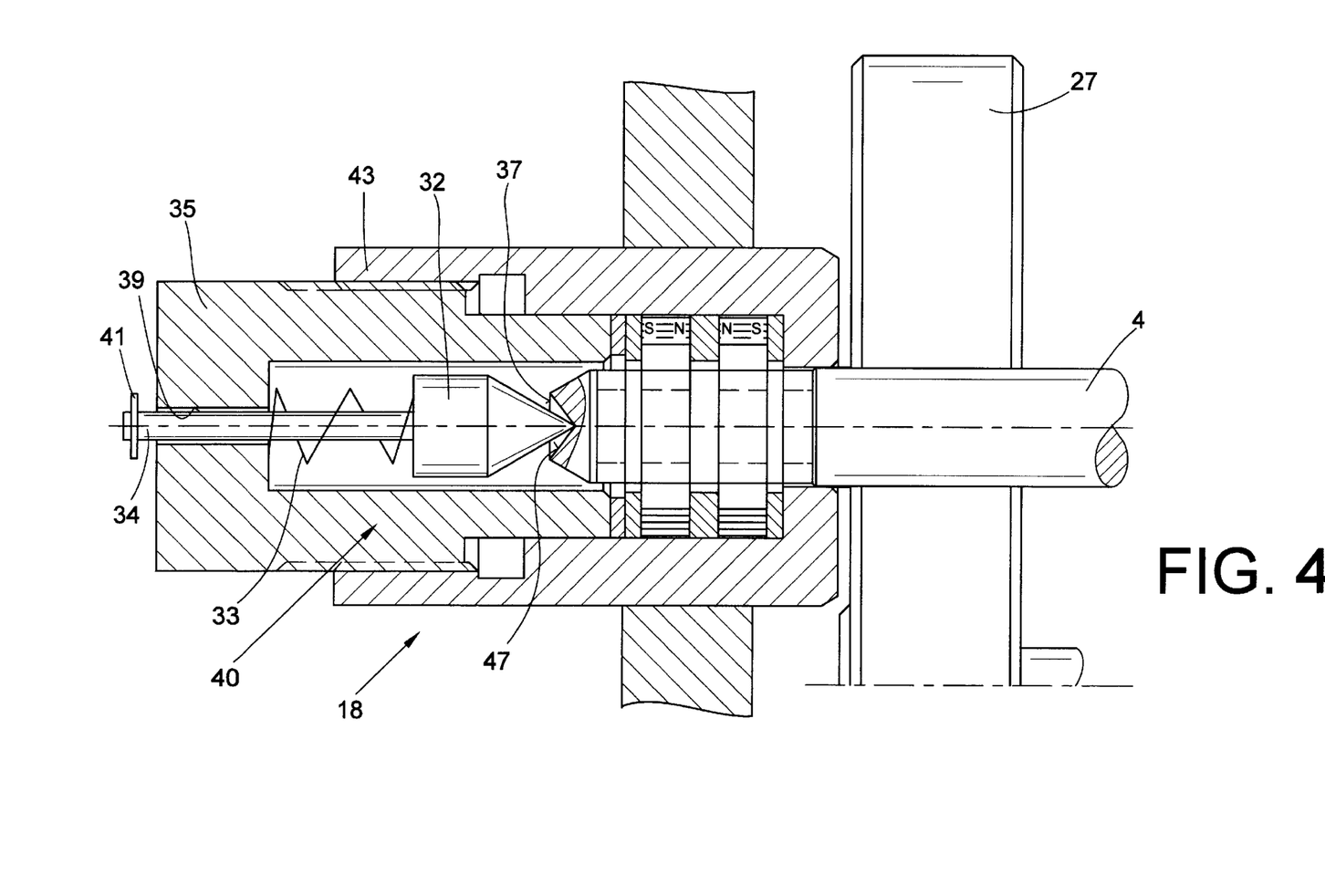
FIG. 4 is a further enlarged partial side elevational view of a spinning rotor rotating in a support ring bearing with a conducting mechanism in accordance with FIG. 2, showing a centering bore in the end of the rotor shaft.

A further embodiment of the diverter mechanism is represented in an enlarged scale in FIG. 4. The embodiment in accordance with FIG. 4 is similar to the embodiment in accordance with FIG. 2, and essentially differs by a centering bore 47 formed in the front face 37 of the rotor shaft 4. The advantage of such an embodiment is, that the conical diverter element 32 is fixed in place with its point in the centering bore 47 located on the front face 37 of the rotor shaft 4. This results in permanent and dependable grounding of the rotor because of the centering of the diverter element 32 as well as the permanent force application by means of the spring 33.

Figure 5:
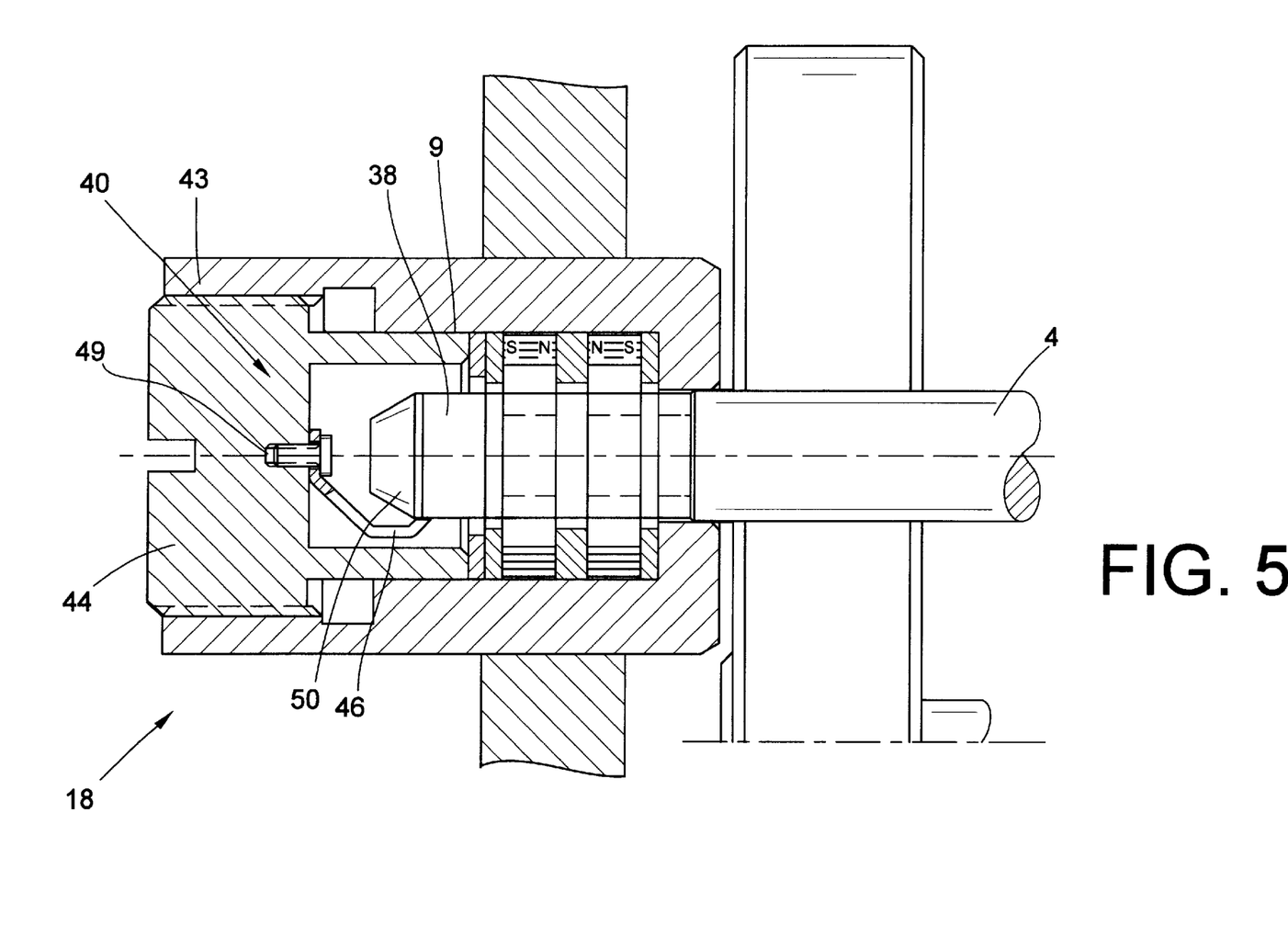
FIG. 5 is another enlarged partial side elevational view of a spinning rotor rotating in a support ring bearing similar to FIG. 4 showing a further embodiment of a conducting mechanism in accordance with the invention in the form of a contact wiper resting on the circumference of the rotor shaft.

FIG. 5 represents a further advantageous embodiment of a diverter mechanism. Here, the diversion of the static charge from the rotor 3 is performed by means of a wiper element 46 running on the circumferential surface 38 of the rotor shaft 4. The wiper element 46 itself is fastened by means of a screw 48 in an axial thread 49 of a locking element 44. The locking element 44 is screwed into the static bearing component 43 with the aid of its exterior thread. In this case the bevel 50 of the rotor shaft 4, as well as the corresponding shape of the wiper element 46 assure that, for example when the rotor 3 is inserted, the contact surface of the wiper element 46 slides without problems on the circumferential surface 38 of the spinning rotor shaft. Also when, with the rotor installed, the locking element 44 is screwed into the static bearing component 43, it is assured by the bevel 50, as well as by the shape of the wiper element 46, that no complications occur.

Figure 6:
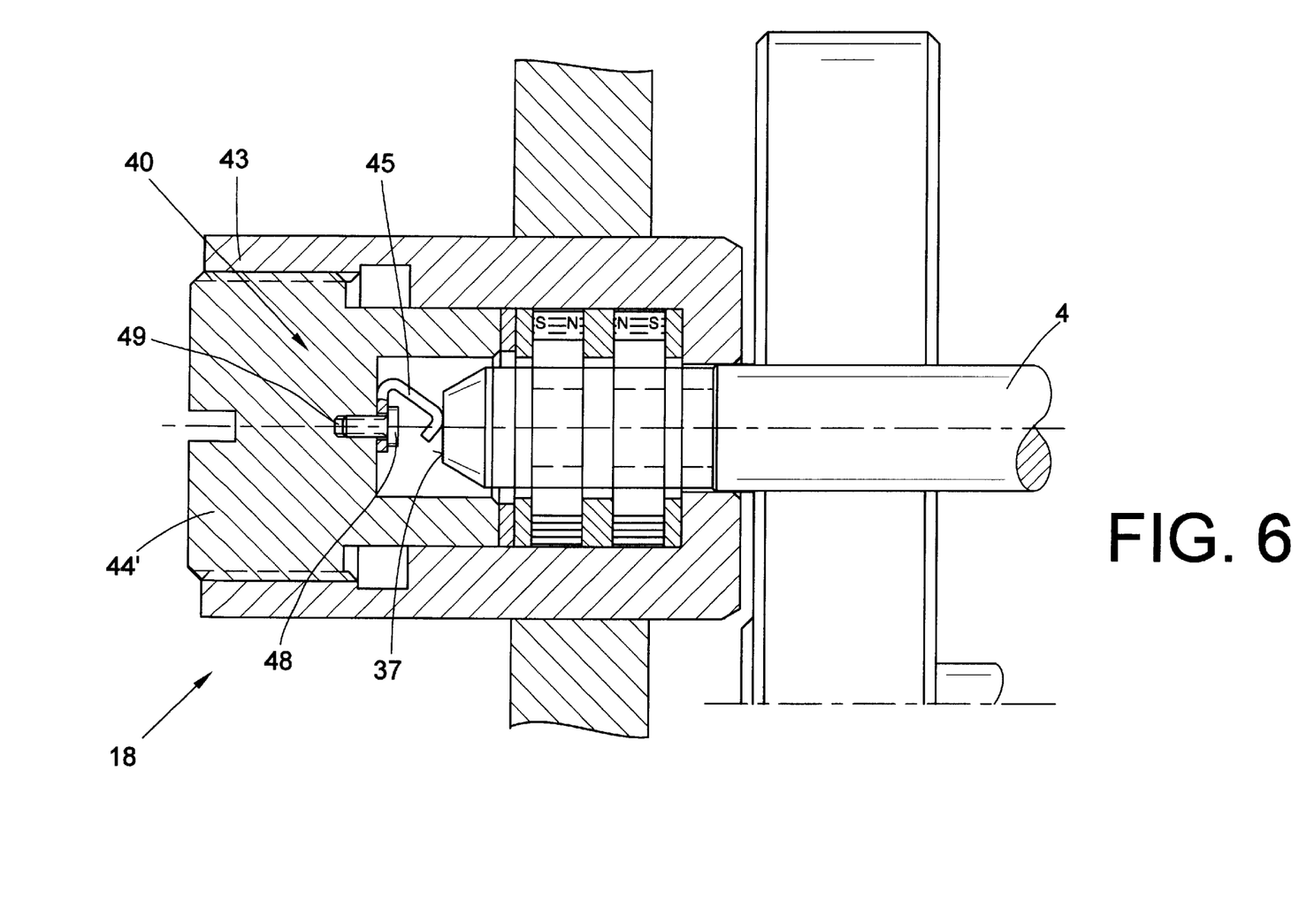
FIG. 6 is another enlarged partial side elevational view of a spinning rotor rotating in a support ring bearing similar to FIGS. 4 and 5 showing an alternative embodiment of a contact wiper conducting mechanism which rests on the front face of the rotor shaft.

FIG. 6 shows a guiding mechanism, which is comparable with the one in FIG. 5. The difference mainly lies in the shape and contact point of the wiper element used. In contrast to FIG. 5, contact is created here by placing a wiper element 45 against the front face 37 of the rotor shaft 4. As in the previously described embodiment, fastening of the wiper element 45 is provided by means of a fastening screw 48, which is screwed into the thread 49 of the locking element 44'. The same as the embodiments in accordance with FIGS. 2 to 4, the embodiment in accordance with FIG. 6 also offers the advantage that contact takes place in the center of the front face of the rotor shaft 4, so that a permissibly low wearing of the involved components, i.e. the rotor shaft 4 as well as the wiper element 45, still results because of the relatively slow circumferential speed in this area.

Figure 7:
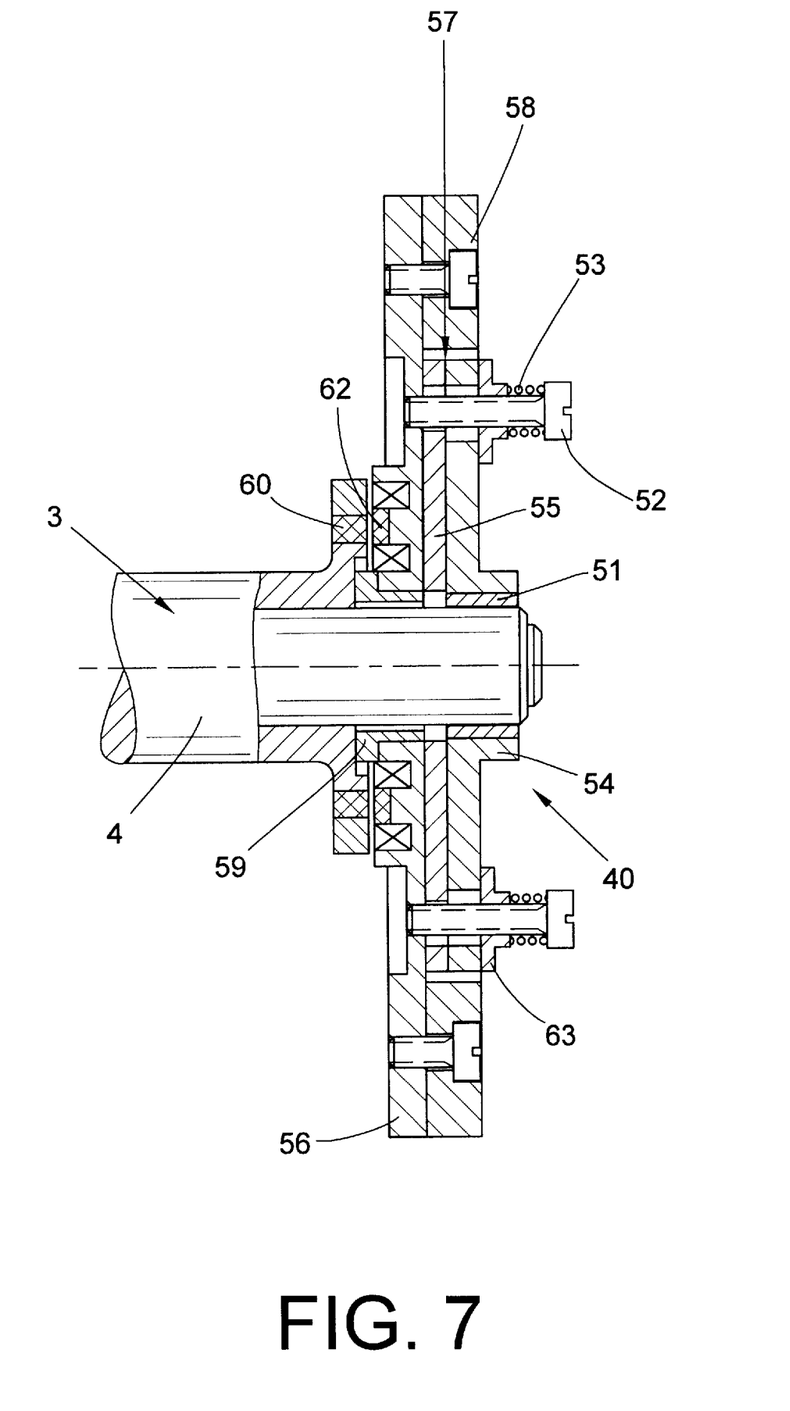
FIG. 7 is a cross-sectional view of a further embodiment of the conducting mechanism in accordance with the invention utilizing a sliding bearing arranged to be radially damping.

With the embodiment represented in FIG. 7, the electrostatic charge of the rotor 3 is diverted into the stator through a sliding bearing 51, which encloses the rotor shaft 4 with a defined degree of play. Because of the conducting material of the sliding bearing, as well as an only minimal bearing play (e.g., a maximum air gap of about 0.2 mm), an almost constant diversion of the static charges is assured, so that in the extreme case only very small charges on the spinning rotor will occur because of the short insulating path. To assure a satisfactory diversion of the static charges, it is of course necessary to provide a permanent conducting connection between the movable friction plate 54, the intermediate plate 55 and the fixed bearing plate 56. Alternatively or in addition, a diversion into the fixed bearing shield 56 via the movable friction plate 54, the small pressure plates 63, the springs 53 and the adjustment screws 52 is also possible. In this connection, it is necessary to pay attention to a suitable selection of the material.

Not only is a dependable diversion of the static charges occurring in the area of the spinning rotor 3 possible by using such a sliding bearing 51, but the problem of the oscillation of contactless seated spinning rotors when they reach their natural oscillation frequency is also diminished.

The sliding bearing 51 is arranged in a friction plate 54, which is seated to be radially displaceable and cushioned. In turn, the friction plate 54 is connected with a bearing plate 56 by means of threaded bolts 52. Thus, the pressure springs 53 in the area of the threaded bolts 52 place the radially movably seated friction plate 54 with a defined axial force against the intermediate plate 55, which in addition is placed against the fixed bearing plate 56. Here, in case of a radial deviation of the rotor shaft in the area of the natural oscillation frequency, a mechanical friction in the area of the friction plate 57 occurs, and thereby produces a sufficient damping. The spring pressure, and therefore the required friction, can be set by adjusting the screws 52, so that any desired amount of damping can be achieved. The maximum radial deflection of the rotor shaft 4 can be achieved either by means of a conventional limit bearing 59, or a mechanical detent, for example in the form of a ring 58, or by limiting the radial friction path by means of an appropriate size of the threaded bolts 52, or respectively of the threaded bores in the friction plate 54.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An open-end spinning device of a textile machine comprising a housing, a spinning rotor, a bearing arrangement for supporting the spinning rotor for rotation within the housing at high turning frequency, the bearing arrangement producing an electric insulation of the rotor from the bearing and the housing, and an arrangement for removing static charges created during operation of the spinning device comprising an electrical conducting mechanism connecting the spinning rotor with a grounded component of the spinning device.

2. The open-end spinning device in accordance with claim 1, wherein the bearing arrangement for supporting the spinning rotor comprises an axial bearing and the conducting mechanism is arranged in the area of the axial bearing.

3. The open-end spinning device in accordance with claim 2, further comprising a rotor shaft, and wherein the electrical conducting mechanism has a diverter element and a force-exerting element acting thereon, the diverter element being arranged for placement against the rotor shaft and conductively connected with the bearing housing.

4. The open-end spinning device in accordance with claim 3, wherein the force-exerting element is a spring.

5. The open-end spinning device in accordance with claim 3, wherein the diverter element comprises a cone resting against the rotor shaft.

6. The open-end spinning device in accordance with claim 3, wherein the diverter element comprises a spherical element resting against the rotor shaft.

7. The open-end spinning device in accordance with claim 3, wherein the rotor shaft has a centering bore at a contact point with the diverter element.

8. The open-end spinning device in accordance with claim 3, wherein the diverter element comprises at least one wiper element which rests against the rotor shaft.

9. The open-end spinning device in accordance with claim 3, wherein the conducting mechanism comprises a sliding bearing enclosing the rotor shaft with a degree of play.

10. The open-end spinning device in accordance with claim 9, wherein the sliding bearing is arranged in a friction plate of the bearing of the spinning rotor which is attached in a radially damped manner on a stator element.

* * * * *